United States Patent [19]
Dobbs

[11] Patent Number: 5,654,518
[45] Date of Patent: Aug. 5, 1997

[54] DOUBLE TRUSS STRUCTURAL ARMOR COMPONENT

[75] Inventor: Steven K. Dobbs, Fullerton, Calif.

[73] Assignee: Rockwell International Corporation, Seal Beach, Calif.

[21] Appl. No.: 569,414

[22] Filed: Dec. 6, 1995

[51] Int. Cl.$^6$ .................................................. F41H 5/04
[52] U.S. Cl. .................................... 89/36.02; 109/49.5
[58] Field of Search ........................ 89/36.02, 36.04; 109/49.5, 82, 83, 84; 428/911

[56] References Cited

U.S. PATENT DOCUMENTS

| | | | |
|---|---|---|---|
| 787,065 | 4/1905 | White | 428/117 |
| 1,625,061 | 4/1927 | Trout | 428/593 |
| 2,190,490 | 2/1940 | Sendzimir | 89/36.02 |
| 2,733,177 | 1/1956 | Meyer | 89/36.02 |
| 2,742,724 | 4/1956 | Fleiss | 428/72 |
| 2,746,892 | 5/1956 | Elfving | 154/45 |
| 3,604,374 | 9/1971 | Matson et al. | 109/49.5 |
| 3,645,216 | 2/1972 | Radford et al. | 109/82 |
| 3,969,563 | 7/1976 | Hollis, Sr. | 428/175 |
| 4,223,053 | 9/1980 | Brogan | 428/35 |
| 4,404,889 | 9/1983 | Miguel | 89/36.02 |
| 4,868,040 | 9/1989 | Hallal et al. | 428/251 |
| 4,916,027 | 4/1990 | Del Mundo | 428/586 |
| 4,992,320 | 2/1991 | Gower | 428/184 |
| 5,200,256 | 4/1993 | Dunbar | 428/212 |
| 5,288,538 | 2/1994 | Spears | 428/116 |
| 5,348,601 | 9/1994 | Ray | 156/155 |
| 5,349,893 | 9/1994 | Dunn | 89/36.05 |
| 5,435,226 | 7/1995 | McQuilkin | 89/36.02 |

FOREIGN PATENT DOCUMENTS

| | | | |
|---|---|---|---|
| 2573511 | 5/1986 | France | 89/36.02 |
| 663 | of 1874 | United Kingdom | 89/36.02 |

Primary Examiner—Stephen M. Johnson
Attorney, Agent, or Firm—Lawrence N. Ginsberg; Charles T. Silberberg

[57] ABSTRACT

A double truss structural armor component includes a first face sheet, an intermediate sheet opposing the first face sheet, a first truss core member sandwiched between the first face sheet and the intermediate sheet, a second face sheet opposing the intermediate sheet, a second truss core member sandwiched between the second face sheet and the intermediate sheet, and laminate materials disposed within interior flutes of the first and second truss core members. The first tress core member has a flute axis. The second truss core member has a flute axis which is oriented in a range of about 45° to 90° from the flute axis of the first truss core member. Thus, a biaxially redundant load path is formed. The first and second face sheets, the intermediate sheet, and the first and second truss core members are formed of high toughness, high strength titanium alloys. The laminate materials which are within the interior flutes of the truss core members are bonded to portions of the flutes that are adjacent to the intermediate sheet. The laminate materials have high energy of break properties. During impact of a ballistic fragment, one of the face sheets slows down the fragment and flattens and further fragments the fragment. When the resulting fragments impact the laminate materials, their energies are absorbed by the laminate materials by high strain deformation of the laminate materials in biaxial directions. Thus, the fragments are brought to rest and are prevented from penetrating the other face sheet. During impact of a blast wave, the energy wave is partially absorbed by one of the face sheets, deforming and transferring load to the truss core members. These members deform in a buckling mode in biaxial directions, thereby absorbing the blast energy in a spring-like manner, preventing fracture of the other face sheet.

14 Claims, 2 Drawing Sheets

DOUBLE TRUSS STRUCTURAL ARMOR COMPONENT

BACKGROUND OF THE INVENTION

1. Field of the Invention

The present invention relates to armor structures, and more particularly to lightweight, high strength structural armor components requiring minimum space allocation, and having improved capability for surviving high energy blast loads and impeding penetration therethrough by high speed projectiles.

2. Description of the Related Art

Conventional armor plating is typically made of ceramic materials, metallic materials, high-elongation organic materials, or a combination of two or more thereof. An example of conventional armor, is disclosed in U.S. Pat. No. 4,404,889 issued to Miguel. The '889 armor includes layers of high density steel honeycomb, balsa wood, and ballistic resistant nylon sandwiched in various arrangements between outer layers of steel armor plate.

An improvement in lightweight structural armor is disclosed in U.S. Pat. No. 5,435,226 issued to Fred McQuilkin and assigned to Rockwell International Corporation. The '226 armor employs a 3-sheet single truss core design with abrasive or laminate materials provided in the interior cells or flutes of the truss members. The abrasive or laminate materials are held in place by inflating bladders during the bonding process, which are later removed.

The single truss axis of the '226 design provides energy absorption from the blast wave concentrated primarily in one axis, which can possibly allow large structural deflections in the axis transverse to the truss core member axis. Also, fragment energy dissipation is accomplished by laminates inserted into the truss member flutes which are oriented in a single axis only. A fragment can possibly migrate between the laminate inserts and thus reduce the laminate energy absorption capability.

Ceramic materials offer significant efficiency in defeating armor piercing projectiles at the lowest weight per square foot of surface area. The ceramic armor sections are generally mounted on a tough support layer such as glass-reinforced plastics. Boron carbide, silicon carbide and alumina are ceramics which are commonly used in armor plating.

However, ceramic plates have the serious drawback of being unable to sustain and defeat multiple hits by armor piercing projectiles. Because relatively large sections of ceramic material must be used to stop these projectiles and because these sections shatter completely when hit by a projectile, the ceramic armor is unable to defeat a second projectile impacting close to the preceding impact. Moreover, sympathetic shattering of adjacent ceramic sections usually occurs, still further increasing the danger of penetration by multiple rounds.

In addition, ceramic armors are difficult and costly to manufacture; not only are very high manufacturing temperatures required, but also processing is time consuming because very slow cooling is necessary to avoid cracking. Also, ceramic armor cannot carry significant structural loads, and therefore adds parasitic weight to the load carrying structure.

Metallic materials have been implemented for light weight armor applications because they possess excellent ability to defeat multiple, closely spaced impacts of armor piercing projectiles. However, this class of materials is often far heavier than desired and difficult to fabricate into intricate contours. Moreover, the weight of metallic materials have typically precluded their extensive use in such lightweight mobile weapons systems as helicopters and small water craft.

OBJECTS AND SUMMARY OF THE INVENTION

It is, therefore, a principal object of the present invention to provide a new and improved lightweight armor structure especially for high intensity blast threats with fragments, and for structural applications that have minimum available space.

It is another object to provide a structural armor component useful in protecting floor and wall panels of aircraft and ground and marine vehicles that are subject to high blast and fragment type threats.

Another object is to overcome all of the disadvantages and drawbacks of known similar structures that have less blast resistant capability.

These and other objects are accomplished by the present invention, which is a double truss structural armor component. In its broad aspects, it includes a first face sheet, an intermediate sheet opposing the first face sheet, a first truss core member sandwiched between the first face sheet and the intermediate sheet, a second face sheet opposing the intermediate sheet, a second truss core member sandwiched between the second face sheet and the intermediate sheet, and laminate materials disposed within interior flutes of the first and second truss core members. The first truss core member has a flute axis. The second truss core member has a flute axis which is oriented in a range of about 45° to 90° from the flute axis of the first truss core member. Thus, a biaxially redundant load path is formed. The first and second face sheets, the intermediate sheet, and the first and second truss core members are formed of high toughness, high strength titanium alloys. The laminate materials which are within the interior flutes of the truss core members are bonded to portions of the flutes that are adjacent to the intermediate sheet. The laminate materials have high energy of break properties.

During impact of a ballistic fragment, one of the face sheets slows down the fragment and flattens and further fragments the fragment. When the resulting fragments impact the laminate materials, their energies are absorbed by the laminate materials by high strain deformation of the laminate materials in biaxial directions. Thus, the fragments are brought to rest and are prevented from penetrating the other face sheet.

During impact of a blast wave, the energy wave is partially absorbed by one of the face sheets, deforming and transferring load to the truss core members. These members deform in a buckling mode in biaxial directions, thereby absorbing the blast energy in a spring-like manner, preventing fracture of the other face sheet.

Cellular foam materials are preferably disposed within the interior flutes for providing pressure against the laminate materials during an adhesive curing cycle of the laminate materials, which bonds the laminate materials to the intermediate sheet and to the truss core members. The foam materials also serve to absorb a portion of the blast wave energy by crushing deformation of the foam materials in a spring-like manner.

The key advantages of the double truss core structural armor design of the present invention relative to the previously referenced '226 patent are as follows:

1) The biaxial orientation of the laminate inserts of the present invention increases the energy absorption capability to "catch" the fragment and prevent migration of the ballistic fragments between the laminate inserts. The redundancy afforded by this double transverse orientation of the laminate inserts also improves the armor's capability to withstand multiple fragment impacts.

2) The biaxial orientation of the truss core members of the present invention, increases the capability to absorb blast wave energy and prevent large structural deflections in both axes of the panel. Although the single truss core design disclosed in the '226 patent is effective for most design threats, the double truss core armor of the present invention is particularly useful for defeating high-blast threats and explosion upon impact threats.

3) The method of using foam that is expanded within the double truss core flutes, which presses the laminate against the flute and intermediate sheet surfaces during the laminate bonding cycle has improved efficiency. Also, the foam serves as a portion of the blast energy absorption mechanism of the armor panel.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
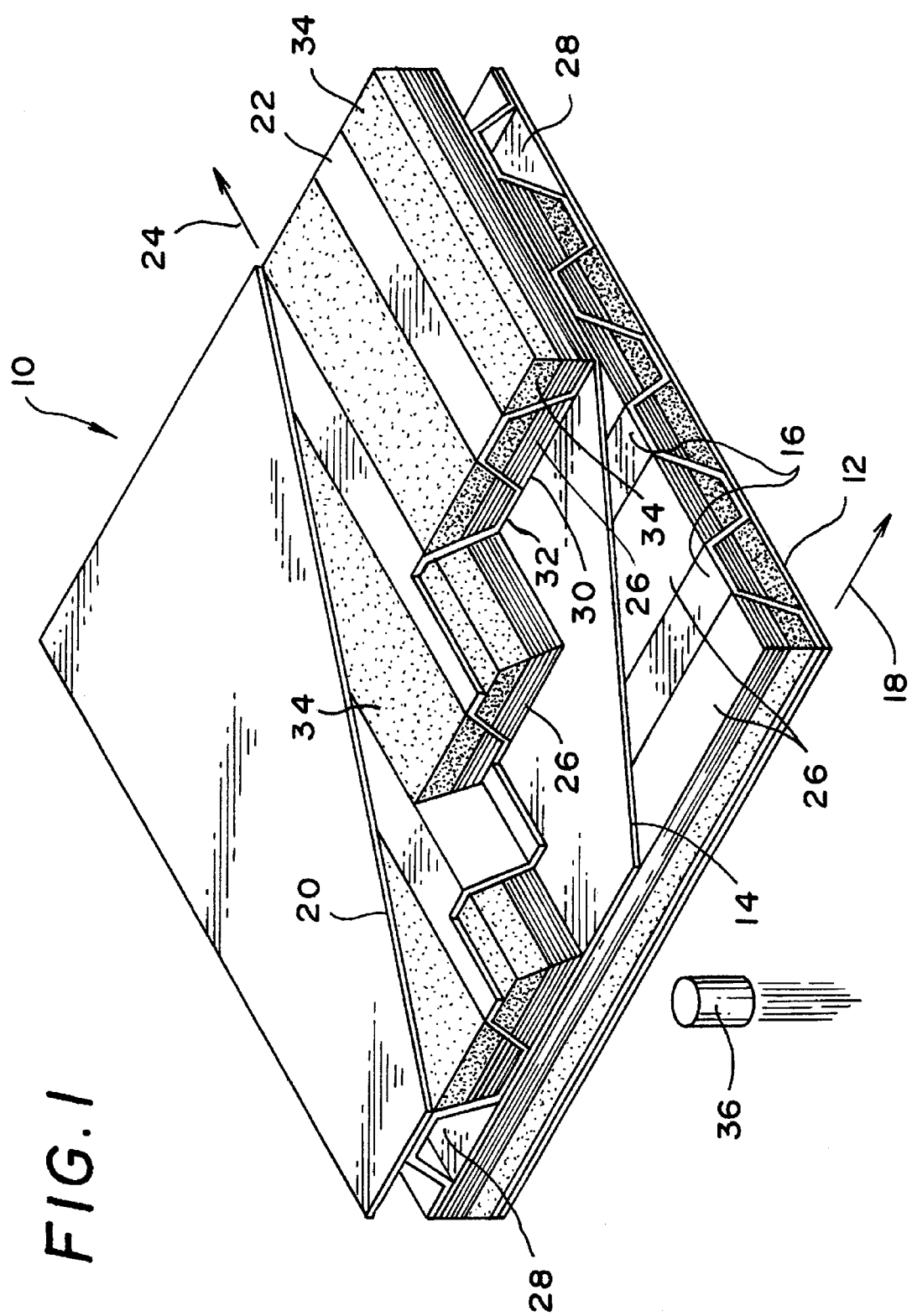
FIG. 1 is a perspective view of a double truss core structural armor component, of the present invention.

Referring now to the Figures and the characters of reference marked thereon, FIG. 1 illustrates a preferred embodiment of the structural armor component of the present invention, designated generally as 10.

Component 10 includes a first face sheet 12. An intermediate sheet 14 opposes the first sheet 12. A first truss core member 16 is sandwiched between the first face sheet 12 and the intermediate sheet 14. The first truss core member has a flute axis, designated by arrow 18. A second face sheet 20 opposes the intermediate sheet 14. A second truss core member 22 is sandwiched between the second face sheet 20 and the intermediate sheet 14. The second truss core member 22 has a flute axis, designated by arrow 24 oriented approximately transverse from the flute axis 18 of the first truss core member 16, to form a biaxially, redundant load path, as will be explained in detail below.

The face sheets 12, 20, the intermediate sheet 14 and the truss core members 16, 22 are all formed of high toughness, high strength titanium alloys. As defined herein, the term "high strength" refers to ultimate tensile strength properties in a range of about 140 ksi to 175 ksi and "high toughness" refers to fracture toughness (Kapp) properties in a range of about 130 ksi-inches$^{1/2}$ to about 185 ksi-inches$^{1/2}$. Preferably, the strength properties should be in a range of about 155 ksi to about 175 ksi and toughness properties should be in a range of about 155 ksi-inches$^{1/2}$ to 185 ksi-inches$^{1/2}$.

The titanium alloys are preferably an alpha-beta class of titanium alloys. Such alpha-beta class of titanium alloys may comprise, for example, titanium 6242S or titanium 6-22-22. These alloys are preferably processed into a high toughness and high strength state by a special heat treatment process, such as that trademarked under the name RX2™ manufactured by Rockwell International Corporation. The RX2™ process is disclosed and claimed in U.S. patent application, Ser. No. 08/339,856, incorporated herein by reference, entitled "A Method for Processing Micro-Structure-Property Optimization of Alpha-Beta Titanium Alloys to Obtain Simultaneous Improvements in Mechanical Properties and Fracture Resistance", assigned to Rockwell International.

Another high toughness, high strength titanium alloy, which can be utilized with the inventive features of the present invention include the alloy known as Corona 5™ titanium, having the composition of 4.5 wt. % Al, 5 wt. % Mo, and 1.5 wt. % Cr, with the remainder being titanium.

Laminate materials 26 are disposed within interior flutes 28 of the first and second truss core members 16, 22. It is noted that in FIG. 1, the numeral 28 indicate empty flutes prior to insertion of the laminate materials. These flutes 28 are shown empty for the purposes of clarity. The laminate materials are bonded to portions of the flutes 28 that are adjacent to the intermediate sheet 14. Thus, as indicated by the position denoted by numeral designation 30, alternating laminate materials 26 are bonded to the intermediate sheet 14 while other alternating laminate materials for example, at the position denoted by numeral designation 32, are bonded to the flute of the truss core member which is, in turn, bonded to the intermediate sheet 14. In other words, it is necessary that the laminate materials 26 be bonded as closely as possible to, if not actually upon, the intermediate sheet 14. The biaxial orientation of the laminates enable the materials to act as a "catcher's mitt" to absorb part or all of the energy of the ballistic fragments after they have been abraded by the face sheet. This functional aspect of the laminate materials will be discussed below in more detail.

The laminate materials may include, high strength synthetic fibers, as for example, the laminated materials known as "Kevlar®" and "Spectra®". The laminate materials utilized by the present invention are required to have high energy of break properties. As defined herein, the term "high energy of break" refers to a range of 0.003 micro inches per inch to about 0.007 micro inches per inch. A preferred range is from about 0.006 micro inches per inch to about 0.007 micro inches per inch.

Cellular foam materials 34 are disposed within the interior flutes in the volume not occupied by the laminate materials 26. The cellular foam materials 34 provide pressure against the laminate materials 26 during an adhesive curing cycle of the laminate materials 26, which bond the laminate materials to the intermediate sheet 14 and/or to the truss core members 16, 22. The cellular foam materials 34 may comprise, expanding epoxy syntactic films that foam from 8 to 10 times their thickness under a heat curing cycle. An example of such a film is the film marketed under the trademark Microply EM3®. Another method for providing the foam is by use of a commercially available pre-foam liquid solution that is poured in the flute, which then expands into a cellular foam due to a chemical reaction.

The mechanism by which the armor 10 defeats an explosion and fragments of a ballistic threat is as follows:

During impact of a ballistic fragment 36, the face sheet 12 slows down the fragment 36 and flattens and further fragments the fragment. When the resulting fragments impact the laminate materials 26, their energies are absorbed by the laminate materials 26 by high strain deformation of these materials in biaxial directions. Thus, the fragments are brought to rest and are prevented from penetrating the other face sheet 20.

During impact of the subsequent blast wave, the energy wave is partially absorbed by the face sheet 12, deforming and transferring load to the truss core members 16, 22, which deform in a buckling mode in biaxial directions, thereby absorbing the blast energy in a spring-like manner, thus preventing the fracture of the other face sheet 20.

The foam materials 34 serve to absorb a portion of the blast wave energy by crushing deformation of the foam materials 34 in a spring-like manner.

It is noted that although the flute axes have been shown to be approximately 90°, this being the preferred orientation, the flutes may be oriented in a range from about 45° to 90°.

The face sheets 12, 20 can either be monolithic titanium or partially diffusion bonded or adhesively bonded laminated titanium. Use of laminated titanium offers an advantage over the monolithic titanium in that it improves the lateral spread of the impact energy of the fragment. The lateral dispersion of energy is due to the energy breaking the adhesive bonds between the laminate layers.

The shape of the panels can either be flat for applications such as cargo floors of aircraft, of land vehicles or engine enclosures for Marine vehicles. Or, the panels can be curved in either a uniaxial or biaxial direction for applications such as aircraft fuselages or interior walls or for enclosures around critical subsystems such as liquid oxygen bottles and hydraulic system installations. The process by which truss core panels may be formed into various curved shapes includes creep forming and superplastic forming.

Figure 2:
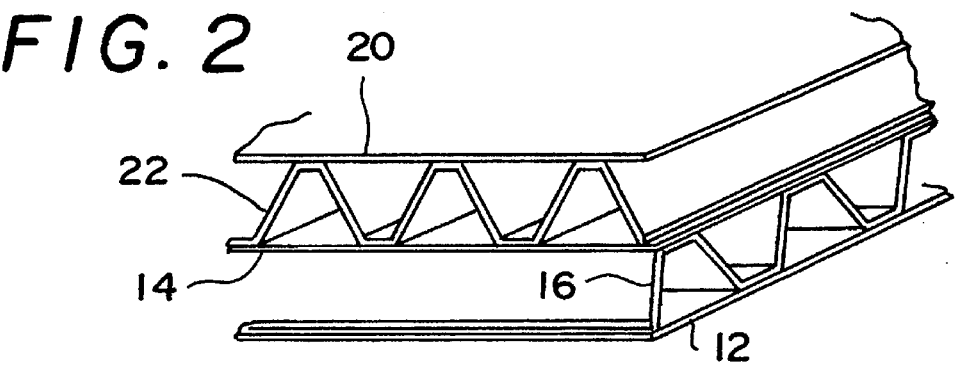
FIG. 2 is a perspective view of the initial 5-sheet double transverse truss core panel, illustrating the initial step in the armor component fabrication process of the present invention.

Referring now to FIG. 2, the initial step in the armor component fabrication process of the present invention is illustrated.

FIG. 2 shows an initial 5-sheet double transverse truss core panel. In a first method of fabrication, the panel formed by first diffusion bonding the 5-sheets together then, secondly, expanding the panel by a superplastic forming inflating process. In a second method, the panel is laser welded together, then superplastically expanded by an inflation process. These processes are well known in the aerospace industry.

Figure 3:
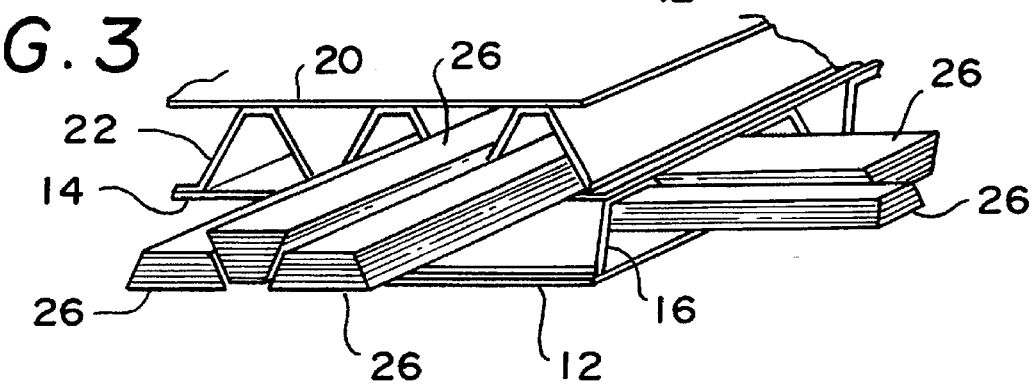
FIG. 3 shows the insertion of the laminate material into the interior flutes.

Referring now to FIG. 3, the laminate material 26 is first formed in a monolithic sheet, then cut up into inserts commensurate with the shapes of the internal flutes of the truss core members. Adhesive is then applied to the inserts. They are then inserted into the flutes. The laminates 26 are inserted into the tops of the lower flutes 26 and into the bottoms of the upper flutes 26 so as to make them adjacent to the intermediate sheet 14.

Figure 4:
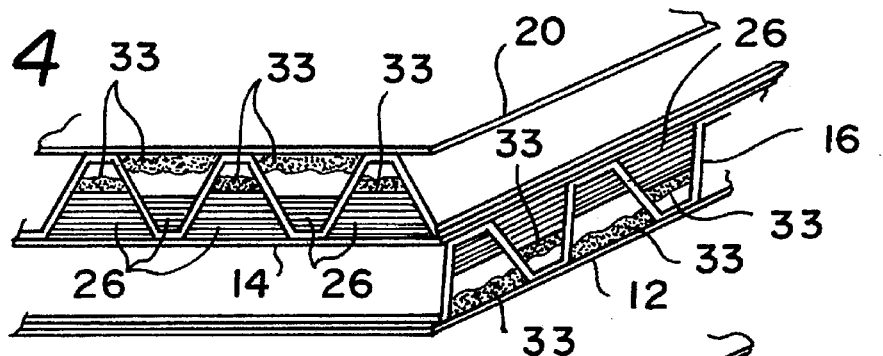
FIG. 4 shows the insertion of the pre-foam material into the interior flutes.
Figure 5:
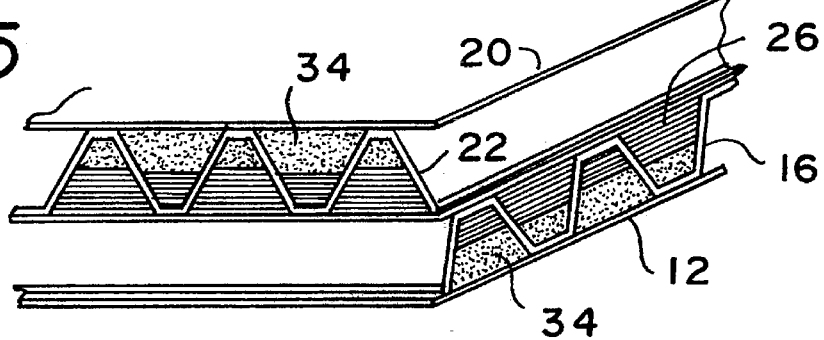
FIG. 5 illustrates foam expansion to fall the voids in the flutes, forming the finished panel.

Referring now to FIG. 4, the epoxy syntactic film 33 or prefoam liquid is shown applied to the interior of the flutes. As can be seen by reference to FIG. 5, the resulting foam 34 expands and presses against the laminate materials 26 providing a strong adhesive bond forming the finished panel.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A double truss structural armor component, comprising:

a) a first face sheet;

b) an intermediate sheet opposing said first face sheet;

c) a first truss core member sandwiched between said first face sheet and said intermediate sheet, said first truss core member having a flute axis;

d) a second face sheet opposing said intermediate sheet;

e) a second truss core member sandwiched between said second face sheet and said intermediate sheet, said second truss core member having a flute axis being oriented in a range of from about 45° to 90° from said flute axis of said first truss core member to form a biaxially, redundant load path, said first and second face sheets, said intermediate sheet, and said first and second truss core members being formed of high toughness, high strength titanium alloys; and f) laminate materials disposed within interior flutes of said first and second truss core members, said laminate materials being bonded to portions of said flutes that are adjacent to said intermediate sheet, said laminate materials having high energy of break properties, wherein, during impact of a ballistic fragment, one of said face sheets slows down said fragment and flattens and further fragments said fragment, and when the resulting fragments impact said laminate materials, their energies are absorbed by said laminate materials by high strain deformation of said laminate materials in biaxial directions, thereby bringing said fragments to rest and preventing them from penetrating the other face sheet and during impact of a blast wave, the energy wave is partially absorbed by said one of said face sheets deforming and transferring load to said truss core members, which deform in a buckling mode in biaxial directions, thereby absorbing the blast energy in a spring-like manner, thus preventing fracture of said other face sheet.

2. The structural armor component of claim 1, further comprising:

cellular foam materials disposed within said interior flutes for providing pressure against said laminate materials during an adhesive curing cycle of said laminate materials, which bonds said laminate materials to said intermediate sheet and to said truss core members, said foam materials also serving to absorb a portion of the blast wave energy by crushing deformation of said foam materials in a spring-like manner.

3. The structural armor component of claim 1, wherein said first and second face sheets, said intermediate sheet, and fast and second truss core members are formed of an alpha-beta class of titanium alloys having ultimate tensile strength properties in a range of about 140 ksi to 175 ksi and fracture toughness (Kapp) properties in a range of about 130 ksi-inches$^{1/2}$ to about 185 ksi-inches$^{1/2}$.

4. The structural armor component of claim 1, wherein said first and second face sheets, said intermediate sheet, and first and second truss core members are formed of an alpha-beta class of titanium alloys having tensile strength properties in a range of about 155 ksi to 175 ksi and fracture toughness properties in a range of about 155 ksi-inches$^{1/2}$ to about 185 ksi-inches$^{1/2}$.

5. The structural armor component of claim 1, wherein said flute axis of said second truss core member is oriented about 90° from said flute axis of said first truss core member.

6. The structural armor component of claim 1, wherein said first and second face sheets, said intermediate sheet, and said first and second truss core members are formed of an alloy having the composition of 4.5 wt. % Al, 5 wt. % Mo and 1.5 wt. % Cr, with the remainder being titanium.

7. The structural armor component of claim 1, wherein said first face sheet is formed of a partially diffusion bonded laminated titanium sheet.

8. The structural armor component of claim 1, wherein said first face sheet is formed of a monolithic titanium sheet.

9. A process for fabricating a double truss structural component, comprising the steps of:
   a) bonding and forming a double truss core panel by a five-sheet bonding and superplastic forming process, said double truss core panel comprising:
      i) a first face sheet;
      ii) an intermediate sheet opposing said first face sheet;
      iii) a first truss core member sandwiched between said first face sheet and said intermediate sheet, said first truss core member having a flute axis;
      iv) a second face sheet opposing said intermediate sheet; and
      v) a second truss core member sandwiched between said second face sheet and said intermediate sheet, said second truss core member having a flute axis being oriented in a range of from about 45° to 90° from said flute axis of said first truss core member to form a biaxially, redundant load path, said first and second face sheets, said intermediate sheet, and said first and second truss core members being formed of high toughness, high strength titanium alloys;
   b) applying adhesive to laminate material inserts having high energy of break properties, said laminate material inserts being sized and shaped to fit within portions of flutes of said first and second truss core members; and,
   c) inserting said laminate material inserts into said flutes of said first and second truss core members.

10. The process of claim 9, further including the step of: inserting a pre-foam material into other portions of said flutes of said first and second truss core members, said pre-foam material expanding to form a cellular foam material that fills the remaining empty portions of said flutes.

11. The process of claim 10, wherein said step of inserting a pre-foam material comprises the step of inserting expanding epoxy syntactic films.

12. The process of claim 10, wherein said step of inserting a pre-foam material comprises the step of pouring a pre-foam solution.

13. The process of claim 9, wherein said step of bonding and forming a double truss core panel comprises the step of diffusion bonding.

14. The process of claim 9, wherein said step of bonding and forming a double truss core panel comprises the step of laser welding.

* * * * *